(12) United States Patent
Saito et al.

(10) Patent No.: US 8,653,778 B2
(45) Date of Patent: Feb. 18, 2014

(54) INVERTER-INTEGRATED ELECTRIC COMPRESSOR

(75) Inventors: Atsushi Saito, Isesaki (JP); Makoto Shibuya, Isesaki (JP); Kouki Yoshizawa, Isesaki (JP); Hideo Ikeda, Isesaki (JP)

(73) Assignee: Sanden Corporation, Gunma (JP)

( * ) Notice: Subject to any disclaimer, the term of this patent is extended or adjusted under 35 U.S.C. 154(b) by 140 days.

(21) Appl. No.: 13/375,188

(22) PCT Filed: May 28, 2010

(86) PCT No.: PCT/JP2010/059147
§ 371 (c)(1),
(2), (4) Date: Nov. 29, 2011

(87) PCT Pub. No.: WO2010/137709
PCT Pub. Date: Dec. 2, 2010

(65) Prior Publication Data
US 2012/0076679 A1 Mar. 29, 2012

(30) Foreign Application Priority Data

May 29, 2009 (JP) ................................. 2009-130311

(51) Int. Cl.
*H02P 1/00* (2006.01)
*F04C 18/02* (2006.01)
*H02K 11/00* (2006.01)

(52) U.S. Cl.
USPC .................. 318/500; 318/400.25; 318/400.3; 417/371; 417/410.1

(58) Field of Classification Search
USPC ........ 318/400.25, 400.3, 500; 417/410.1, 371
See application file for complete search history.

(56) References Cited

U.S. PATENT DOCUMENTS

| 4,802,008 | A * | 1/1989 | Walling .......................... 725/67 |
| 5,982,253 | A * | 11/1999 | Perrin et al. ................... 333/182 |
| 8,303,271 | B2 * | 11/2012 | Ikeda et al. .................... 417/371 |
| 8,441,160 | B2 * | 5/2013 | Watanabe et al. ............... 310/71 |
| 2010/0209266 | A1 * | 8/2010 | Ikeda et al. ................. 417/410.1 |
| 2011/0206544 | A1 * | 8/2011 | Saito et al. ................. 417/410.1 |
| 2011/0211980 | A1 * | 9/2011 | Shibuya et al. ............. 417/410.1 |
| 2011/0211981 | A1 * | 9/2011 | Saito et al. ................. 417/410.1 |
| 2011/0217190 | A1 * | 9/2011 | Mizuno et al. ............. 417/410.1 |
| 2011/0217191 | A1 * | 9/2011 | Fujimra et al. ............. 417/410.1 |

(Continued)

FOREIGN PATENT DOCUMENTS

| JP | 2000-291557 | 10/2000 |
| JP | 2005-102370 | 4/2005 |
| JP | 2006-033986 | 2/2006 |

(Continued)

*Primary Examiner* — Paul Ip
(74) *Attorney, Agent, or Firm* — Cozen O'Connor

(57) ABSTRACT

Provided is an inverter-integrated electric compressor having high heat resistance, which is capable of suppressing thermal interference among a plurality of power devices. Specifically provided is an inverter-integrated electric compressor which comprises a built-in motor and a substrate provided with a motor drive circuit including an inverter, an electric component including the substrate being affixed in a housing space surrounded by a compressor housing, wherein a plurality of power semiconductor elements which constitute the motor drive circuit are disposed radially around a drive shaft of the motor in a plane crossing the drive shaft. For example, the planar shape of the power semiconductor element is formed into a rectangle, and a gap having a sectorial planar shape is formed between the power semiconductor elements adjacent to each other.

5 Claims, 3 Drawing Sheets

(56) References Cited

U.S. PATENT DOCUMENTS

| | | | |
|---|---|---|---|
| 2011/0256002 A1* | 10/2011 | Ikeda | 417/410.1 |
| 2011/0291501 A1* | 12/2011 | Watanabe et al. | 310/71 |
| 2012/0045353 A1* | 2/2012 | Watanabe et al. | 417/410.1 |
| 2012/0063935 A1* | 3/2012 | Fujimura et al. | 417/410.1 |
| 2012/0119688 A1* | 5/2012 | Hattori et al. | 318/400.25 |
| 2013/0049550 A1* | 2/2013 | Watanabe et al. | 310/67 R |

FOREIGN PATENT DOCUMENTS

| | | |
|---|---|---|
| JP | 2006-037837 | 2/2006 |
| JP | 2007-303399 | 11/2007 |
| JP | 2008-228380 | 9/2008 |

* cited by examiner (A)

(B)

INVERTER-INTEGRATED ELECTRIC COMPRESSOR

This is a U.S. National Phase under 35 U.S.C. §371 of International Application No. PCT/JP2010/059147 filed on May 28, 2010 and claims priority on Japanese Patent Application No. 2009-130311, filed on May 29, 2009, the entire content of which is hereby incorporated by reference.

TECHNICAL FIELD OF THE INVENTION

The present invention relates to an inverter-integrated electric compressor to which a motor drive circuit including an inverter is mounted, and specifically relates to an inverter-integrated electric compressor which is excellent in heat resistance.

BACKGROUND ART OF THE INVENTION

A structure which is depicted in FIG. 4 of Patent document 1 is known as a structure of an inverter section of an inverter-integrated electric compressor to which a motor drive circuit including an inverter is mounted inside. In such a structure, power MOS transistor modules are arrayed, axially in three rows and circumferentially in two columns, as being adjacent to each other, and low-pressure refrigerant gas is flowed thereinto so as to cool down the power MOS transistor modules.

Additionally, in a pump housing of a fluid pump device depicted in FIG. 2 of Patent document 2, plate-shaped power transistors are arrayed outward in an radial direction, and are fixed through block formed into a shape of partially notched ring.

PRIOR ART DOCUMENTS

Patent Documents

Patent Document 1: JP2003-322082-A
Patent Document 2: JP2000-073962-A

SUMMARY OF THE INVENTION

Problems to be Solved by the Invention

If such a matrix array disclosed in Patent document 1 should be applied to an inverter-integrated electric compressor, of which inverter section is provided on a top face of cylindrical section at the side of a suction port, a motor shaft in the center of the inverter section might restrict a place to be provided with power devices so as not to achieve uniform cooling to a plural of power devices. Also, the power transistor array of the fluid pump device disclosed in Patent document 2 does not make the cooling performance enough because of insufficient gaps between adjacent power transistors.

Accordingly, focused on the above-described problems, an object of the present invention is to provide an inverter-integrated electric compressor which is excellent in heat resistance and which can suppress thermal interference among a plurality of power devices.

Means for Solving the Problems

To achieve the above-described object, an inverter-integrated electric compressor according to the present invention is an inverter-integrated electric compressor having a built-in motor, a substrate provided with a motor drive circuit including an inverter and electric component parts including the substrate fixed in a housing space surrounded by a compressor housing, characterized in that a plurality of power semiconductor elements, which constitute the motor drive circuit, are disposed radially around a drive shaft of the motor in a plane crossing the drive shaft. For example, the plane is a plane which perpendicularly crosses the drive shaft of the motor.

The inverter-integrated electric compressor according to the present invention can be achieved as an inverter-integrated electric compressor which is excellent in heat resistance, because a plurality of the power semiconductor elements constituting the motor drive circuit are disposed radially around the drive shaft in the plane crossing the drive shaft and therefore thermal interference among adjacent power devices is suppressed. In addition, an inverter-integrated electric compressor, which is compact having as few protrusions as possible, can be achieved by forming an inverter housing into a shape closer to a cylinder because the power semiconductor elements are disposed radially around the drive shaft in the plane crossing the drive shaft.

In the inverter-integrated electric compressor according to the present invention, it is preferable that the power semiconductor element comprises an MOSFET. An insulated gate bipolar transistor (IGBT), which is a power semiconductor element of which gate section is provided with the MOSFET, can be exemplified as a power semiconductor element comprising the MOSFET. Semiconductor elements comprising such an MOSFET require to be mounted to a relatively large space among elements constituting the inverter section, and they radiate relatively great amount of heat. Therefore, the inverter section can be compactly formed as promoting heat radiation from each power semiconductor element by radially arraying power semiconductor elements around the drive shaft in a plane crossing the drive shaft of the motor.

In the inverter-integrated electric compressor according to the present invention, it is preferable that terminal parts of the power semiconductor elements are disposed toward a side of the drive shaft. When the power semiconductor elements are disposed radially and toward the drive shaft side, the terminal parts come to gather around the drive shaft so that a circuit placement is easily designed.

In the inverter-integrated electric compressor according to the present invention, it is preferable that a planar shape of the power semiconductor element is an approximate rectangle and a gap which has a sectoric planar shape is formed between power semiconductor elements disposed next to each other. When such a gap, which has a sectoric planar shape and has a thickness in a direction of the drive shaft, is formed, heat radiation from the power semiconductor elements can be promoted.

In the inverter-integrated electric compressor according to the present invention, it is preferable that the gap is provided with a supporting section for supporting a control substrate, on which an electric component part to control the power semiconductor element is mounted, which is stacked on a power device-mounting section for mounting the power semiconductor element. More concretely, it is preferable that the supporting section is provided with a boss section in which a bolt hole for fixing the control substrate is bored. If some parts of the control substrate should be fixed by bolts, etc. in order to prevent vibration, component parts would not be capable of being provided on sites for boring the bolt holes, and therefore the control substrate might have to grow in size. Consequently, when the boss section, in which the bolt hole has been bored, is formed on the gap which tends to be a dead space, component parts can be mounted on the control substrate efficiently. Particularly, because the gaps are formed discretely and radially along the array of the power semiconductor elements, it is unlikely that the control substrate is biased in bolt fixing.

The inverter-integrated electric compressor according to the present invention is suitably used in an air conditioning system for vehicles. Namely, the inverter-integrated electric compressor according to the present invention can easily achieve such specifications as heat resistance, vibration resistance and compactness, which are required for air conditioning system mounted on an engine of a vehicle.

Effect According to the Invention

An inverter-integrated electric compressor according to the present invention makes it possible to achieve downsizing of an inverter section and downsizing of a whole compressor while suppressing heat interference between power semiconductor elements, because the power semiconductor elements are radially disposed around the drive shaft in a plane crossing the drive shaft of the motor.

EMBODIMENTS FOR CARRYING OUT THE INVENTION

Hereinafter, desirable embodiments of the present invention will be explained as referring to figures.

Figure 1:
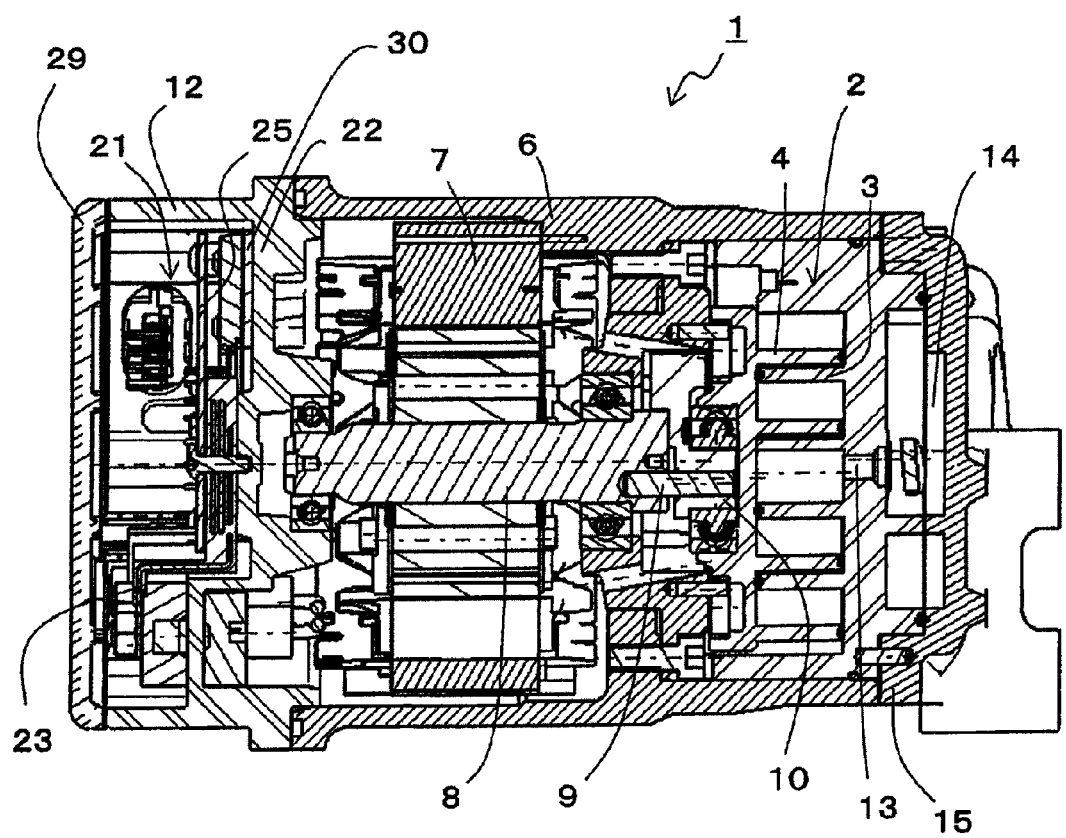
FIG. 1 is a longitudinal section view showing an inverter-integrated electric compressor according to an embodiment of the present invention.

FIG. 1 shows a whole of inverter-integrated electric compressor according to an embodiment of the present invention. In FIG. 1, compression mechanism 2 is comprised of fixed scroll 3 and movable scroll 4. Movable scroll 4 is swung relative to fixed scroll 3 as prevented from rotating through a rotation preventing mechanism. Motor 7 is mounted and incorporated in compressor housing (center housing) 6, and main shaft 8 (rotation axis) driven to rotate by motor 7. The rotation of main shaft 8 is converted to a swing of movable scroll 4, through eccentric pin 9 which is provided at an end of main shaft 8 and eccentric bush 10 rotatably engaged to the pin. In this embodiment, refrigerant sucked as fluid to be compressed is led to compression mechanism 2 through a mounting section of motor 7, and the refrigerant compressed by compression mechanism 2 is delivered to an external circuit from compressor housing (rear housing) 15, through discharge hole 13 and discharge chamber 14.

Inverter section 21 is provided with a drive circuit of motor 7 in a housing space surrounded by compressor housing 12 (front housing). For more details, inverter section 21 is provided at an outer side sectioned by partition wall 22 from a side of the refrigerant suction path formed in compressor housing 12. Inverter section 21 supplies electricity to motor 7, through a lead wire and seal terminal 23 (output terminal of inverter section 21) which is attached as penetrating partition wall 22. At a mounting section of seal terminal 23, refrigerant suction path side and inverter section 21 side are sealed. Thus inverter section 21 is provided at an outer side of partition wall 22, so that electric component parts can be at least partially cooled through partition wall 22 by sucked refrigerant.

Inverter section 21 is comprised of electric components, such as substrate 30 for power devices as a mounting section of power devices and control substrate 25, and is also comprised of other electric components such as a capacitor which is provided either separately or integrally therewith. Though in FIG. 1 substrate 30 for power devices is placed on the inverter side surface of partition wall 22, the inverter side surface of partition wall 22 can be used as a mounting section of power devices, without substrate 30 for power devices. The opening side to the outside of compressor housing 12 which mounts inverter section 21 is covered as sealed with lid member 29 while motor drive circuit 21 is protected by lid member 29.

Figure 2:
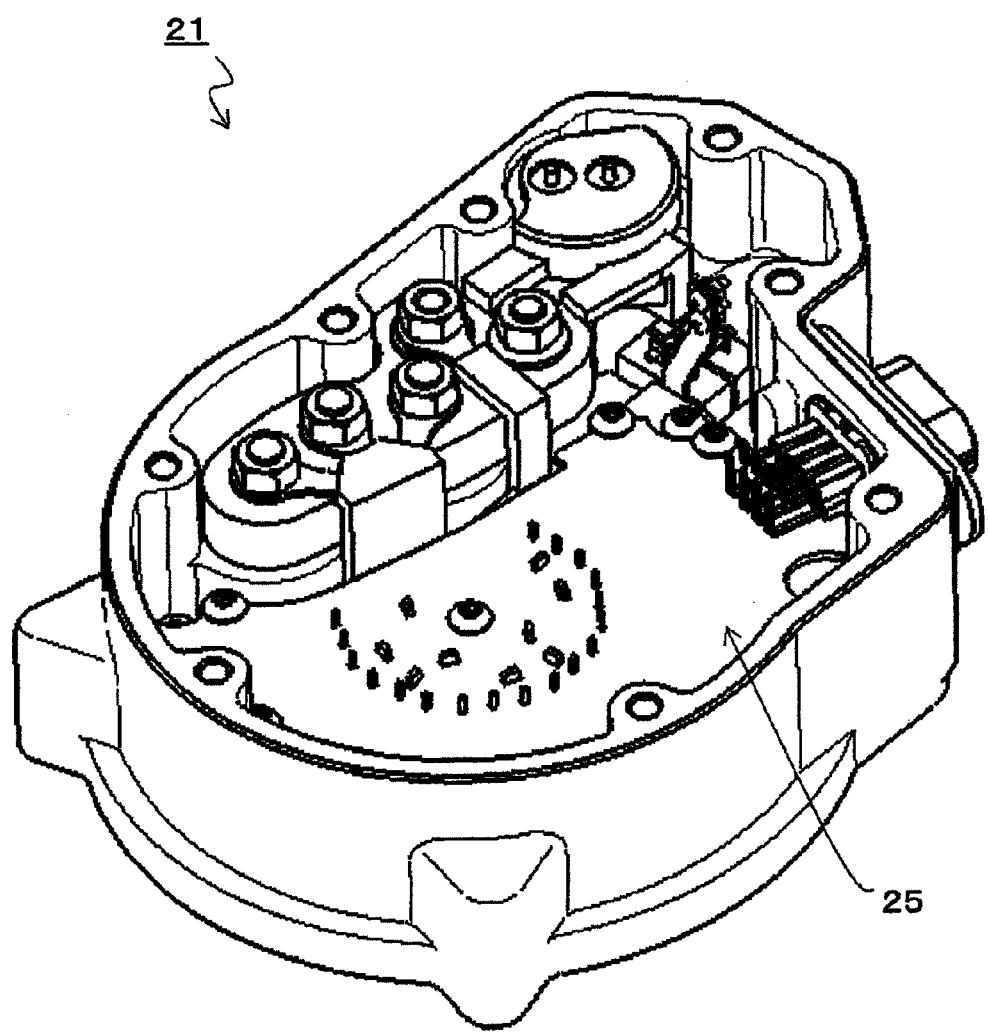
FIG. 2 is a perspective view showing the inverter section in FIG. 1.

FIG. 2 is a perspective view showing inverter section 21 in FIG. 1. Inverter section 21 is comprised of substrate 30 for power devices and control substrate 25, and is also comprised of a noise filter, HV connector and LV connector, etc. A lot of electric component parts are mounted on the control substrate, so that electric component parts constituting inverter section 21 are at least partially cooled with sucked refrigerant.

Figure 3:
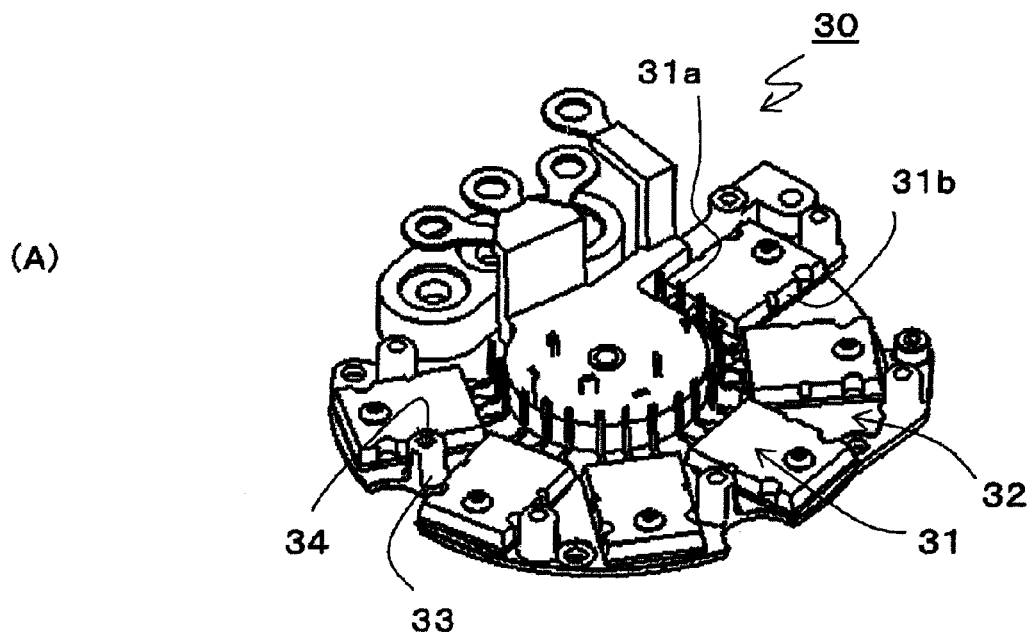
FIG. 3 shows a substrate for power devices constituting the inverter section in FIG. 2, where (A) is a perspective view and (B) is a plan view.
Figure 3:
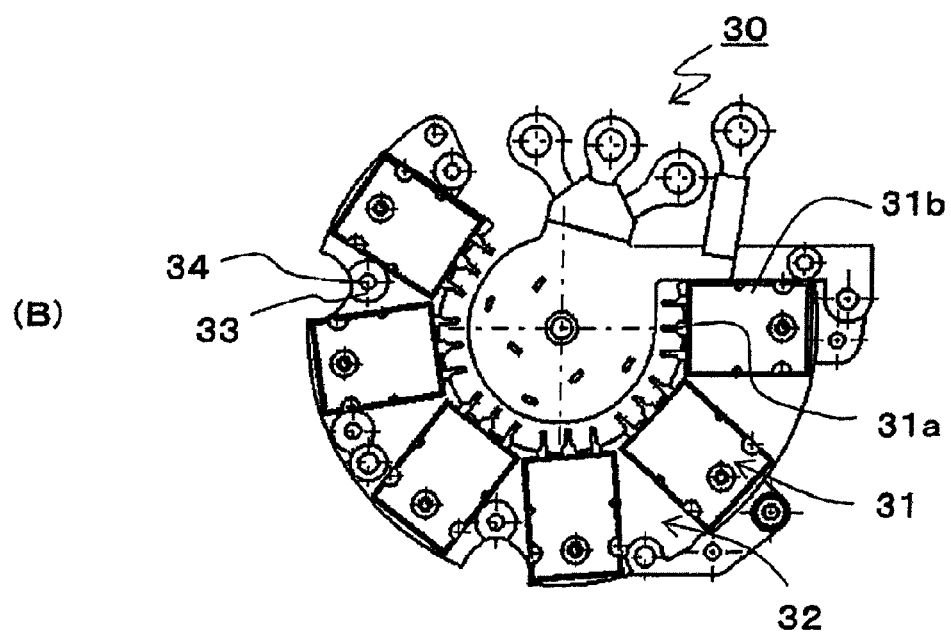

FIG. 3 shows substrate 30 for power devices constituting inverter section 21 in FIG. 2, where (A) is a perspective view and (B) is a plan view. Substrate 30 for power devices is placed so as to cross at right angle to main shaft 8. As shown in FIG. 3(A), 6 pieces of power semiconductor elements (power devices) 31 are mounted radially around main shaft 8 on substrate 30 for power devices, with their terminal sections 31a oriented to the side of main shaft 8. As shown in FIG. 3(A), body sections 31b of power semiconductor elements 31 are shaped like rectangular solids, while sectorial gaps 32 are formed between power semiconductor elements 31 which are mutually adjacent. Such gaps 32 are provided between power semiconductor elements 31, so as to prevent heat interference between adjacent power semiconductor elements 31, and therefore inverter section 21 can be improved in heat radiation ability. Further, when an arc-shaped path for sucked refrigerant is provided at the bottom side of substrate 30, of which top side is provided with arrayed power semiconductor elements 31, for power devices, 6 pieces of power semiconductor elements 31 can be evenly cooled.

In addition, gap 32 is provided with boss section 33 to fix control substrate 25 to substrate 30 for power devices, and a bolt hole 34 is bored in the center of boss section 33. Because boss section 33 is provided in gap 32, substrate 30 for power devices can be downsized, so that the cross-section area of inverter section 21 with respect to main shaft 8 can be further minimized.

Thus inverter section 21 can be improved in heat radiation ability and can be downsized, so that an inverter-integrated electric compressor which has few protrusions can be achieved.

INDUSTRIAL APPLICATIONS OF THE INVENTION

The inverter-integrated electric compressor according to the present invention can be applied to substantially all types of compressors, and specifically, can be used suitably as an automotive compressor, which is often mounted in a narrow space, and of which motor drive circuit tends to be thermally affected by heat radiation from an engine, etc.

EXPLANATION OF SYMBOLS

1: inverter-integrated electric compressor
2: compression mechanism
3: fixed scroll
4: movable scroll
6: compressor housing (center housing)
7: motor
8: main shaft
9: eccentric pin
10: eccentric bush
12: compressor housing (front housing)
13: discharge hole
14: discharge chamber
15: compressor housing (rear housing)
21: inverter section
22: partition wall
23: seal terminal
25: control substrate
29: lid member
30: substrate for power devices
31: power semiconductor element (power device)
31a: terminal section
31b: body section
32: gap
33: boss section
34: bolt hole

The invention claimed is:

1. An inverter-integrated electric compressor comprising:
a compressor housing;
a motor mounted in the compressor housing, the motor having a drive shaft;
a substrate mounted in the compressor housing;
a motor drive circuit mounted to the substrate, the motor drive circuit comprising an inverter and a plurality of semiconductor elements, the semiconductor elements having an approximate rectangular shape and disposed on the substrate in the compressor housing radially around the drive shaft of the motor in a plane perpendicular to the drive shaft with a sectoric planar gap between adjacent semiconductor elements, the substrate having a plurality of boss sections positioned in the sectoric planar gaps, the boss sections being suitable for mounting a control element thereto to control operation of the semiconductor elements.

2. The inverter-integrated electric compressor according to claim 1, wherein the semiconductor elements comprises an MOSFET.

3. The inverter-integrated electric compressor according to claim 1, wherein the semiconductor elements have terminal parts that are disposed toward a side of the drive shaft.

4. The inverter-integrated electric compressor according to claim 1, wherein each boss section has a bolt hole for mounting the control element to each boss section with a bolt.

5. The inverter-integrated electric compressor according to claim 1, wherein the compressor is used in an air conditioning system for vehicles.

* * * * *